US008819655B1

(12) United States Patent
Hopwood et al.

(10) Patent No.: US 8,819,655 B1
(45) Date of Patent: Aug. 26, 2014

(54) SYSTEMS AND METHODS FOR COMPUTER PROGRAM UPDATE PROTECTION

(75) Inventors: Scott G. Hopwood, Pymble (AU); Mark A. Greenwood, North Sydney (AU)

(73) Assignee: Symantec Corporation, Mountain View, CA (US)

( * ) Notice: Subject to any disclaimer, the term of this patent is extended or adjusted under 35 U.S.C. 154(b) by 1625 days.

(21) Appl. No.: 11/901,436

(22) Filed: Sep. 17, 2007

(51) Int. Cl.
G06F 9/44 (2006.01)

(52) U.S. Cl.
USPC ............................. 717/168; 717/171; 717/174

(58) Field of Classification Search
None
See application file for complete search history.

(56) References Cited

U.S. PATENT DOCUMENTS

| | | | | | |
|---|---|---|---|---|---|
| 5,586,304 | A | * | 12/1996 | Stupek et al. | 717/170 |
| 5,619,698 | A | * | 4/1997 | Lillich et al. | 717/168 |
| 5,732,275 | A | * | 3/1998 | Kullick et al. | 717/170 |
| 5,790,856 | A | * | 8/1998 | Lillich | 717/163 |
| 5,796,941 | A | * | 8/1998 | Lita | 726/29 |
| 5,867,647 | A | * | 2/1999 | Haigh et al. | 726/23 |
| 6,070,171 | A | * | 5/2000 | Snyder et al. | 1/1 |
| 6,161,218 | A | * | 12/2000 | Taylor | 717/174 |
| 6,202,207 | B1 | * | 3/2001 | Donohue | 717/173 |
| 6,237,020 | B1 | * | 5/2001 | Leymann et al. | 709/201 |
| 6,305,010 | B2 | * | 10/2001 | Agarwal | 717/126 |
| 6,381,741 | B1 | * | 4/2002 | Shaw | 717/168 |
| 6,434,744 | B1 | * | 8/2002 | Chamberlain et al. | 717/168 |
| 6,473,766 | B1 | * | 10/2002 | Leiserson et al. | 1/1 |
| 6,477,703 | B1 | * | 11/2002 | Smith et al. | 717/168 |
| 7,100,158 | B2 | * | 8/2006 | Nakane et al. | 717/172 |
| 7,155,710 | B2 | * | 12/2006 | Breckner et al. | 717/168 |
| 7,243,347 | B2 | * | 7/2007 | Palmer et al. | 717/170 |
| 7,251,812 | B1 | * | 7/2007 | Jhanwar et al. | 717/171 |
| 7,681,191 | B2 | * | 3/2010 | Yuuki | 717/170 |
| 8,522,228 | B1 | * | 8/2013 | Le et al. | 717/171 |
| 2002/0100036 | A1 | * | 7/2002 | Moshir et al. | 717/173 |
| 2003/0009752 | A1 | * | 1/2003 | Gupta | 717/171 |
| 2003/0236970 | A1 | * | 12/2003 | Palmer et al. | 713/1 |
| 2004/0003266 | A1 | * | 1/2004 | Moshir et al. | 713/191 |
| 2004/0181790 | A1 | * | 9/2004 | Herrick | 717/168 |
| 2004/0268322 | A1 | * | 12/2004 | Chow et al. | 717/136 |
| 2005/0188419 | A1 | * | 8/2005 | Dadhia et al. | 726/1 |
| 2005/0246701 | A1 | * | 11/2005 | Kanapathipillai et al. | 717/168 |
| 2006/0070062 | A1 | * | 3/2006 | Cox et al. | 717/174 |

(Continued)

OTHER PUBLICATIONS

Eric Vaughan , "Installing Windows Vista" TweakHound , Feb. 2, 2007 , <http://web.archive.org/web/20070305163303/http://www.tweakhound.com/vista/installguide.htm> , pp. 1-3.*

Jinyoo Kim et al. , "Vulnerability Discovery in Multi-Version Software Systems", IEEE , 2007 , <http://ieeexplore.ieee.org/stamp/stamp.jsp?tp=&arnumber=4404736> , pp. 1-8.*

(Continued)

*Primary Examiner* — Thuy Dao
*Assistant Examiner* — Samuel Hayim
(74) *Attorney, Agent, or Firm* — ALG Intellectual Property, LLC

(57) ABSTRACT

The disclosure is directed to systems and methods for computer program update protection. In one example, a patch analysis is conducted for a computer program and a determination is made based on the patch analysis as to whether the computer program is vulnerable. Execution of the computer program is permitted if the computer program is determined not to be vulnerable. Execution of the computer program is prevented if the computer program is determined to be vulnerable. In certain embodiments, the computer program is updated if it is determined to be vulnerable. In certain embodiments, an occurrence of a trigger event associated with the computer program is detected and used to initiate the patch analysis, determination of vulnerability, and permitting or preventing of execution of the computer program.

19 Claims, 5 Drawing Sheets

(56) References Cited

U.S. PATENT DOCUMENTS

| | | | |
|---|---|---|---|
| 2006/0080656 A1* | 4/2006 | Cain et al. | 717/174 |
| 2006/0236317 A1* | 10/2006 | Wetherly et al. | 717/168 |
| 2007/0028110 A1* | 2/2007 | Brennan | 713/176 |
| 2007/0028229 A1* | 2/2007 | Knatcher | 717/174 |
| 2007/0162972 A1* | 7/2007 | Tan et al. | 726/22 |
| 2007/0261051 A1* | 11/2007 | Porter et al. | 717/174 |
| 2008/0028389 A1* | 1/2008 | Genty et al. | 717/174 |
| 2008/0222732 A1* | 9/2008 | Caldwell et al. | 717/174 |

OTHER PUBLICATIONS

Zhe Zhang et al., "Optimizing Center Performance through Coordinated Data Staging, Scheduling and Recovery", ACM, 2007, <http://delivery.acm.org/10.1145/1370000/1362696/a55-zhang.pdf>, pp. 1-11.*

Roger Barga et al., "Event Correlation and Pattern Detection in CEDR", Mircrosoft Corporation, 2006, <http://middleware05.objectweb.org/WSProceedings/demos/d1_Barga.pdf>, pp. 1-4.*

* cited by examiner

SYSTEMS AND METHODS FOR COMPUTER PROGRAM UPDATE PROTECTION

BACKGROUND INFORMATION

In computing, the term "patch" is commonly used to refer to an update designed to change a previous version of a computer program. Patches are commonly used to apply fixes to software insecurities and bugs. A typical manufacturer of a computer program periodically releases patches, and persons responsible for maintaining computer systems, such as a user or an administrator of a computer system, receive and install the patches in their respective computing systems.

Tools for assisting with the management and deployment of patches are available. Such conventional tools, which can be especially useful for administrators of large computer systems, are designed to deploy patches at regular intervals. For example, a conventional patch management tool may be configured to deploy patches once a day such as during a predetermined off-peak time period.

Unfortunately, scheduled periodic patching can leave vulnerabilities in a computer system. For instance, an application may be installed to a computing device between regularly scheduled patch deployments. The installed application may be in need of one or more previously released patches, without which the application or the computing device may be insecure and/or buggy. Accordingly, the application, the computing device, and potentially an entire computing system may be in a vulnerable state any time the application is executed before the next regularly scheduled patch deployment is executed and the application patched. Such vulnerabilities, even if temporary, can create significant risks and other problems for owners and operators of computing systems.

While it is possible to decrease the length of time between scheduled patch deployments, this approach is resource intensive and may require significant amounts of network and computing bandwidth. Accordingly, this is not a practical solution for all situations or computing systems. Moreover, simply increasing the frequency of scheduled patch deployments may reduce but does not eliminate the occurrence of application vulnerability.

BRIEF SUMMARY

The disclosure is directed to systems and methods for computer program update protection.

It should be appreciated that the examples disclosed herein can be implemented in numerous ways, including as one or more processes, apparatuses, systems, devices, methods, computer readable media, or computer program products embodied on computer readable media.

In one example, a patch analysis is conducted for a computer program and a determination is made based on the patch analysis as to whether the computer program is vulnerable. Execution of the computer program is permitted if the computer program is determined not to be vulnerable. Execution of the computer program is prevented if the computer program is determined to be vulnerable. In certain embodiments, the computer program is updated if it is determined to be vulnerable. In certain embodiments, an occurrence of a trigger event associated with the computer program is detected and used to initiate the patch analysis, determination of vulnerability, and permitting or preventing of execution of the computer program. Additional details and exemplary embodiments are disclosed below.

BRIEF DESCRIPTION OF THE DRAWINGS

Various embodiments are described with reference to the accompanying drawings, wherein like reference numbers designate like elements, and in which.

DETAILED DESCRIPTION

Figure 1:
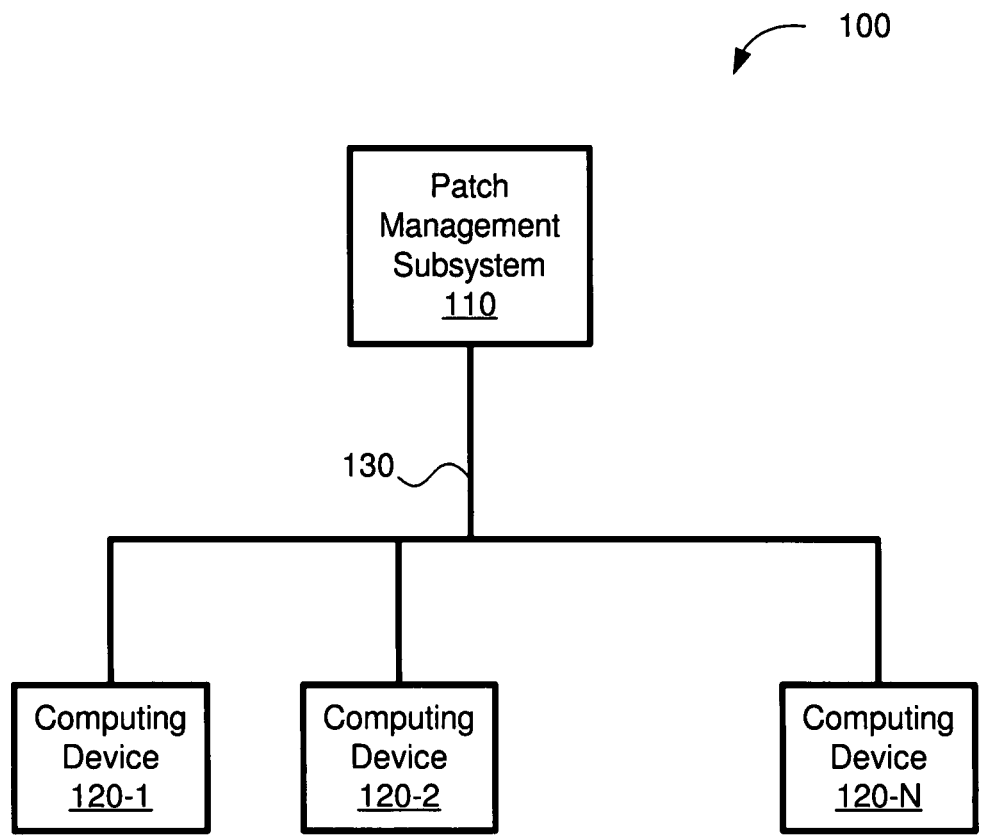
FIG. 1 illustrates an exemplary computing system configured for computer program update protection.

Embodiments described herein will be best understood by reference to the drawings. It will be readily understood that the components generally described and illustrated in the drawings herein, could be arranged and designed in a variety of different configurations. Thus, the following detailed description, as represented in the drawings, is not intended to limit the scope of the disclosure but is merely representative of certain embodiments.

General Concepts

Exemplary systems and methods for computer program update protection are described herein. As used herein, the term "computer program" may refer broadly to any set of computer readable instructions embodied on one or more computer readable media, the instructions being executable by one or more computing devices. Computer programs may include, but are not limited to, applications, subroutines, and operating systems.

Computer program update protection systems and methods disclosed herein can eliminate or at least significantly reduce vulnerabilities that may otherwise exist in computer systems. For example, a user of a computing device in a computer system may install an application to the computing device. The application as installed may be missing a critical patch designed to protect from certain vulnerabilities. Accordingly, the application may be considered vulnerable, and if the application is launched before it is patched (e.g., by performance of a regularly scheduled patch deployment), the computing device and/or computer system may become vulnerable, too. In this or similar manner, conventional computer systems can be made vulnerable to attacks (e.g., intrusions, worms, viruses), bugs, or other problems between regularly scheduled patch deployments.

Such vulnerabilities can be reduced or eliminated by employing trigger-based computer program update protection. In certain embodiments, a predefined trigger event associated with a computer program (e.g., installation of the computer program to a computing device) may be detected. In response, a patch analysis may be conducted for the computer program. From the patch analysis, it may be determined whether the computer program is in a vulnerable state. If the computer program is determined not to be in a vulnerable state, execution of the computer program may be permitted. If the computer program is determined to be in a vulnerable state, its execution may be prevented (i.e., blocked) while it is updated with one or more applicable patches identified in the patch analysis. In certain embodiments, execution of the computer program may be prevented while the patch analysis and the determination of vulnerability are performed. In certain embodiments, the analysis and updating of the computer program may be repeated until a determination is made that the computer program has been successfully updated such that it is no longer considered to be vulnerable, at which point, execution of the computer program may be permitted.

By detecting an occurrence of a predefined trigger event associated with a trigger event and responsively blocking execution of the computer program when it is determined to be in a vulnerable state, the security of the computer program, associated computing device, and potentially an entire computer system can be protected straight away (e.g., with little or no time delay in certain embodiments), without having to wait for execution of a regularly scheduled patch deployment. Thus, trigger-based computer program update protection can fill in vulnerability gaps that may otherwise exist in conventional computer systems. Trigger-based computer program update protection can be especially useful in computer systems having large numbers of computing devices and users who are able to exercise control over the computer programs that are installed and run on their devices.

Exemplary Systems

Turning now to the drawings, FIG. 1 illustrates an exemplary computing system 100 (or simply "the system 100") configured for computer program update protection. As shown, the computing system 100 may include a patch management subsystem 110 communicatively coupled to computing devices 120-1 through 120-N (collectively "the computing devices 120"). The patch management subsystem 110 and computing devices 120 may communicate with one another by way of a network 130 using any suitable communication technologies, including well known network communication technologies, devices, signals, and protocols capable of supporting the processes and communications described herein. Network 130 may include any type and number of networks capable of carrying communication signals between devices connected to the network 130, including but not limited to one or more local area networks, wide area networks, intranets, or the Internet.

In certain embodiments, computing system 100 may include any computer hardware and/or instructions (e.g., software programs), or combinations of software and hardware, configured to perform the processes described herein. In particular, it should be understood that system 100 may include any of a number of well known computing devices, and may employ any of a number of well known computer operating systems, including, but by no means limited to, known versions and/or varieties of Microsoft Windows®, UNIX, Macintosh®, and Linux® operating system software.

Accordingly, the processes described herein may be implemented at least in part as instructions (e.g., one or more computer program products) embodied on one or more computer readable media and executable by one or more computing devices. In general, a processor (e.g., a microprocessor) receives instructions, e.g., from a memory, a computer readable medium, etc., and executes those instructions, thereby performing one or more processes, including one or more of the processes described herein. Such instructions may be stored and transmitted using a variety of known computer readable media.

A computer readable medium (also referred to as a processor readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary computing system 100 is shown in FIG. 1, the exemplary components illustrated in FIG. 1 are not intended to be limiting. Indeed, additional or alternative components, implementations, or computing systems may be used to implement the principles and processes described herein.

Patch management subsystem 110 may include one or more devices configured to communicate with computing devices 120 over network 130. In certain embodiments, for example, patch management subsystem 110 may include or be embodied on one or more servers such as a server running Altiris® Notification Server™ software provided by Altiris, Inc., a division of Symantec Corporation. Patch management subsystem 110 may include and may be configured to execute computer readable instructions embodied on one or more computer readable media, the computer readable instructions being configured for performing computer program update protection operations, including processing messages (e.g., notifications of detections of trigger events) received from the computing devices 120, conducting patch analyses, determining computer program vulnerability, and generating and transmitting data representative of patches, patching instructions, and computer program block and unblock instructions to the computing devices 120.

Figure 2:
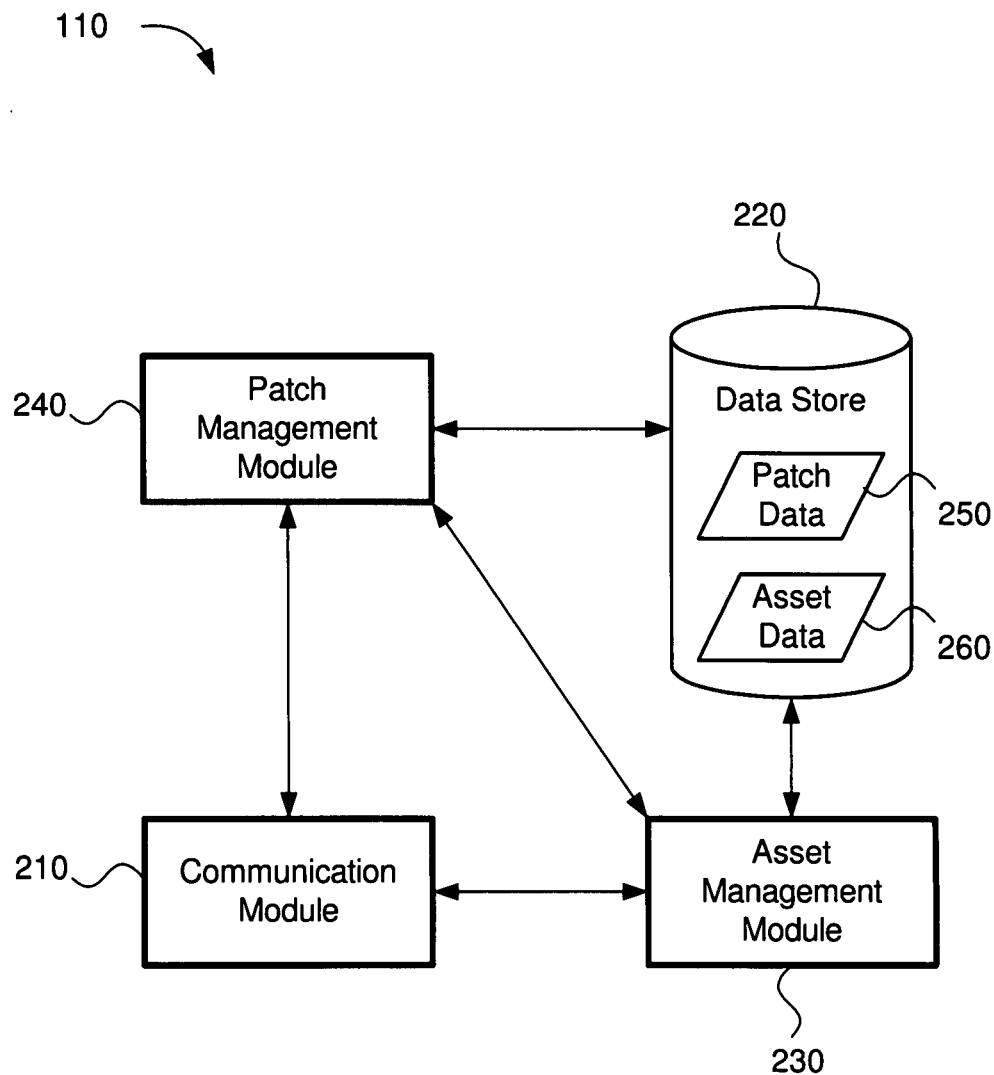
FIG. 2 illustrates components of an exemplary patch management subsystem.

FIG. 2 illustrates exemplary components of the patch management subsystem 110. As shown, the patch management subsystem 110 may include a communication module 210, data store 220, asset management module 230, and patch management module 240 configured to communicate with one another as shown in FIG. 2.

The communication module 210 may include any hardware, computing instructions, or combination thereof supportive of communications with the computing devices 120 over network 130.

Data store 220 may include one or more data storage mediums, devices, or configurations and may employ any type, form, and combination of storage media known to those skilled in the art, including fixed disk drives, read-only memory, caches, databases, optical media, flash memory, and random access memory. Data store 220 may include and/or employ any known technologies useful for performing operations on data, including storing, updating, modifying, accessing, retrieving, and deleting data.

Data store 220 may include any data that is potentially useful for the computer program update protection processes described herein. Among other data, data store 220 may include patch data 250 and asset data 260, which can be used in patch analyses, as described below.

Patch data 250 may include but is not limited to data representative of patches, patch content, information (e.g., bulletins) related to patches (e.g., patch classifications such as a predetermined level of importance of a patch, release dates, timestamps, version information, and other patch attributes), and specifications for patches (e.g., applicable computer programs and minimum computing resources).

Asset data 260 may include data representative of assets of computing system 100, including but not limited to, hardware inventory information (e.g., computing device attributes such as device type identifiers, make and model identifiers, and network addresses), software inventory information (e.g., computer program inventories, identifiers, version information, and other attributes), and any other information related to computing system assets.

Asset management module 230 may be configured to perform operations related to management of assets of system 100, including management of computer programs installed to the computing devices 120. For example, asset management module 230 may be configured to communicate with the computing devices 120 and collect data representative of their hardware and/or software assets. Collected data may be stored as asset data 260 in data store 220. The process of collecting and storing data descriptive of the assets of the system 100 may be referred to as "asset inventorying." As an example, asset management module 230 may inventory the computer programs installed on a particular computing device 120 and record information about the computer programs (e.g., application ID and version information) in data store 220 as asset data 250. As described below, asset data 260 may be utilized when conducting a patch analysis and/or determining whether system 100 or any component thereof is vulnerable.

Asset management module 230 may be configured to perform functions related to the monitoring of occurrences of events in system 100, including events that occur on computing devices 120 and/or network 130. As an example, asset management module 230 may be configured to process a trigger event notification message received from a computing device 120 and notify patch management module 240 of the message. Patch management module 240 may be configured to perform one or more processes in response to being notified of the occurrence of a trigger event, as described below.

Asset management module 230 may be configured to perform functions for controlling the utilization of assets in system 100. For example, asset management module 230 may be configured to instruct a computing device 120 to permit or prevent execution of a computer program installed to the computing device 120. The asset management module 230 may provide such an instruction in response to a message received from the patch management module 240.

In certain embodiments, asset management module 230 may employ one or more of Altiris® Application Management Solution™ software, Altiris® Application Control Solution™ software, and Altiris® Application Metering Solution™ software provided by Altiris, Inc., a division of Symantec Corporation.

Patch management module 240 may be configured to perform operations related to management and deployment of computer program updates in system 100, including obtaining, managing, and deploying patches to the computing devices 120.

The patch management module 240 may be configured to obtain patches and associated information from any suitable source. For example, patch management module 240 may receive patch bulletins such as those typically released by manufacturers of computer programs. The bulletins may include information about computer programs and patches for the computer programs. A typical bulletin, for instance, may identify a computer program, a patch that has been released for the computer program, a classification of the patch (e.g., a classification indicating the importance level for the patch (e.g., critical, mandatory, or recommended), as well as other information related to the patch, the computer program, and requirements and/or instructions for applying the patch to the computer program. Received patches, bulletins, and other related data may be stored to data store 220 and may be included in the patch data 250, which can be utilized in computer program update protection operations such as conducting a patch analysis and determining whether system 100 or any component thereof (e.g., a computer program on a computing device 120) is vulnerable, as described below. The process of acquiring and management patches and related information may be referred to as "patch inventorying."

Patch management module 240 may be configured to perform patch analyses, which may be designed to identify assets of system 100 that are missing available patches. Patch data 250 and asset data 260 may be utilized by patch management module 240 to perform a patch analysis. For example, patch management module 240 may access asset data 260 and retrieve information associated with a computer program installed in system 100. The retrieved information may be used by patch management module 240 to search patch data 250 for application patches and/or information. Accordingly, available and application patches for the computer program can be identified. In certain embodiments, the patch management module 240 may be configured to conduct a patch analysis in response to the asset management module 230 providing notification of an occurrence of a trigger event.

Based on a patch analysis conducted for a computer program, the patch management module 240 can determine whether the computer program is vulnerable. This determination may be made using predefined heuristics and criteria, which may be configured by an administrator of system 100. Accordingly, an administrator can define "vulnerability" as may best fit a particular computing system 100 or implementation. In certain embodiments, "vulnerable" may be defined as a state in which a computer program is installed in system 100 (e.g., on a computing device 100) and as installed is missing at least one application patch, i.e., an applicable patch has not yet been applied to the computer program. In other embodiments, "vulnerable" may be defined as a state in which a missing applicable patch has a predetermined classification, such as a "critical" or "mandatory" level of importance. For any acceptable definition of "vulnerability," the patch management module 240 may be configured to determine whether a computer program or other asset of system 100 is in a vulnerable state.

Patch management module 240 may be configured to provide notification of determined asset vulnerability. For example, patch management module 240 may notify asset management module 230 of the outcome of a vulnerability determination, i.e., whether an asset such as a computer program is determined to be vulnerable or non-vulnerable. Asset management module 230 may be configured to act based on the notification, including permitting or preventing execution of the computer program based on the determination of vulnerability.

Patch management module 240 may be configured to perform operations for updating assets of system 100, including computer programs installed to computing devices 120. For example, patch management module 240 may be configured to communicate with and transmit patches and related instructions to the computing devices 120, which may be configured to apply the patches to the appropriate computer programs.

The process of deploying patches may be referred to as "patching" or "updating" computer programs. The patching process may be performed in any manner suitable for successfully applying patches to assets of system 100. In certain embodiments, the patching process may be performed in any of the ways disclosed in co-pending U.S. patent application Ser. No. 11/901,327, entitled "Systems and Methods for Patching Computer Programs," by Mark Greenwood et al., filed on the same day as the present application, and hereby fully incorporated herein by reference in its entirety.

In certain embodiments, the patch management module 240 may employ Altiris® Patch Management Solution™ software provided by Altiris, Inc., a division of Symantec Corporation.

A computing device 120 may include any hardware and computing instructions (e.g., software) capable of operating one or more computer programs and performing computer program update protection operations disclosed herein. For example, the computing device 120 may include, but is in no way limited to, a personal computer, a workstation, a personal digital assistant, or any device having a CPU, memory, input and output devices, at least one fixed disk, and at least one computer program that can be executed by the device. It is contemplated that the principles described herein may be applied to these and other computing systems and devices, both existing and yet to be developed, using the methods and principles disclosed herein.

Figure 3:
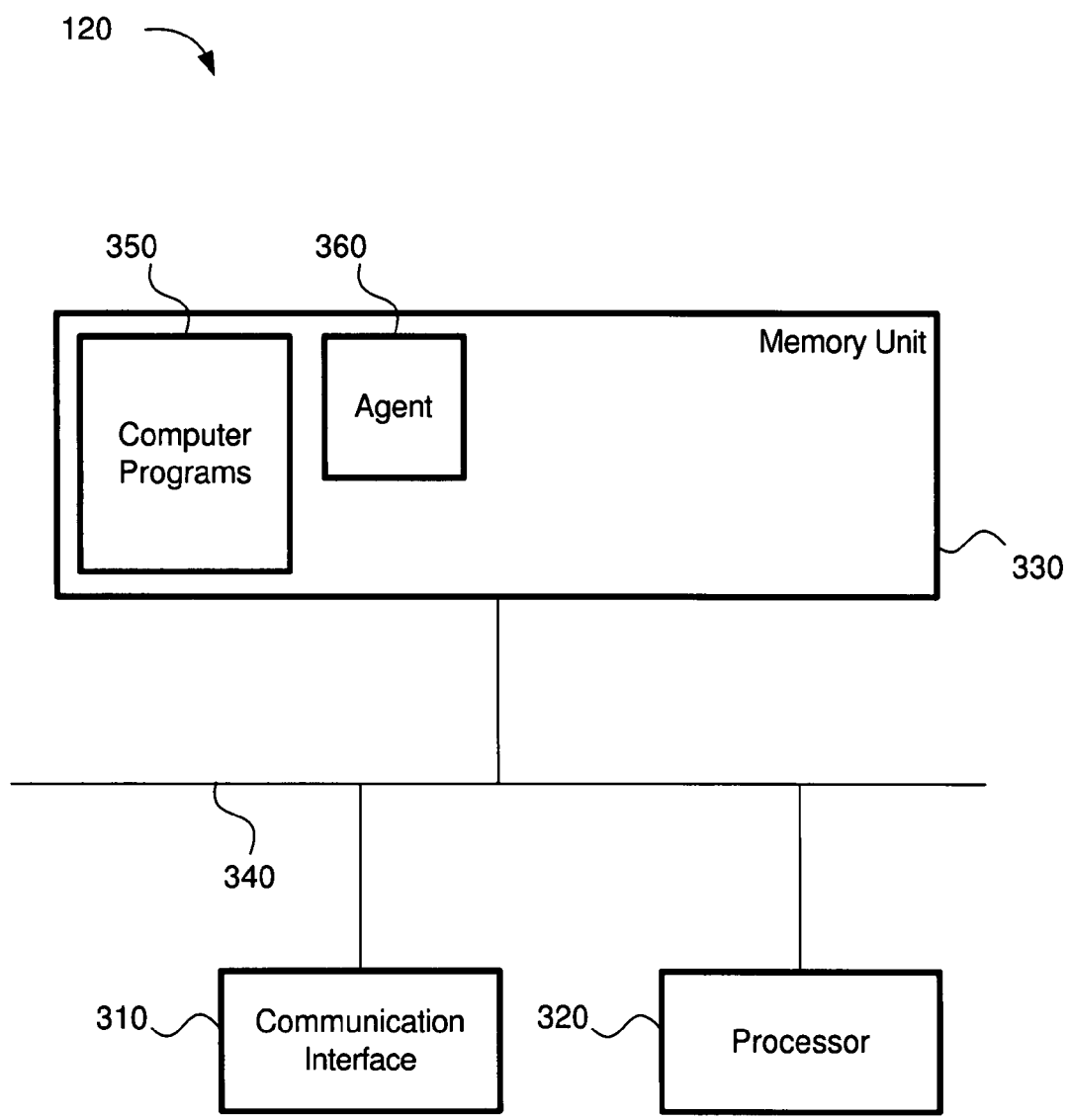
FIG. 3 illustrates components of an exemplary computing device environment.

FIG. 3 illustrates components of an exemplary computing device 120. As shown, computing device 120 may include a communication interface 310, processor 320, and memory unit 330 communicatively coupled to one another by a bus 340. The illustrated components and their interconnection are illustrative only and not limiting in any sense.

Communication interface 310 may include any suitable technologies for sending, receiving, and optionally processing or preprocessing communication signals. In certain embodiments, communication interface 310 is configured for sending and receiving communications to/from patch management subsystem 110 over network 130.

Processor 320 may be configured to execute computer-readable instructions, including computer-readable instructions in the form of computer programs 350 or an agent 360 stored in memory unit 330. Memory unit 330 may include one or more data storage mediums, devices, or configurations and may employ any type, form, and combination of storage media known to those skilled in the art, including fixed disk drives, read-only memory, caches, databases, optical media, flash memory, and random access memory.

Agent 360 may be configured to perform one or more computer program update protection operations disclosed herein. As mentioned, agent 360 may include or be in the form of computer-readable instructions executable by processor 320. Accordingly, processor 320 or computing device 120 may be said to perform computer program update protection operations as instructed by agent 360.

While described as a single agent 360 herein, agent 360 may include or be in the form of multiple agents or other sets of computing instructions. In certain embodiments, agent 360 may employ software associated with one or more of Altiris® Application Management Solution™ software, Altiris® Application Control Solution™ software, Altiris® Application Metering Solution™ software, and Altiris® Patch Management Solution™ software provided by Altiris, Inc., a division of Symantec Corporation.

In the examples disclosed herein, agent 360, asset management module 230, and patch performance module 240 are described as being configured for performing particular operations. The examples are illustrative only and in no way limiting. In other embodiments, operations may be performed by any one or more of the agent 360, asset management module 230, patch performance module 240, or other components of system 100. For example, one or more operations performed by agent 360 in one embodiment may be offloaded from computing device 120 and performed by asset management module 230 and/or patch management module 240 in another embodiment. For instance, monitoring and/or data collecting functions performed by agent 360 in one embodiment may be offloaded and provided as a service to computing device 120, without having to actually install an application or service on the computing device 120. Such alternative configurations, which may be referred to as "zero footprint" configurations," may be useful for conserving the resources of computing device 120, which conservation may be especially beneficial is certain implementations and environments.

In certain embodiments, agent 360 may be configured to collect and report information about the assets of computing device 120. The asset information may be collected in any suitable manner, including obtaining the information during or after installation or activation of hardware or software. As an example, the agent 360 may be configured to request and receive asset information, such as information associated with computer programs 350 (e.g., application name, version, state, installation date, manufacturer, product identifier, file locations, etc.) installed to the computing device 120 and any updates applied to the computer programs 350, from computer program files, system files, or configuration settings.

In one example, agent 360 may be configured to gather asset information from an "installer package" such as a Microsoft Windows® installer package, which commonly has a ".msi" extension in certain versions of Microsoft Windows® operating system software. A ".msi" package is a collection of information for the files, settings, and configuration information associated with a computer program 350. Accordingly, agent 360 can collect information associated with computer programs 350 that were installed using an "installer package."

Agent 360 may provide collected information to patch management subsystem 110 where the information can be stored in data store 220 as asset data 260. The asset information may be provided in any suitable way, including over network 130.

Agent 360 may be configured to monitor for and detect the occurrence of one or more predetermined trigger events, including trigger events associated with computer programs 350. The monitoring may be performed in any manner suitable for detecting a trigger event. In certain embodiments, for example, agent 360 may be configured to monitor for one or more events indicative of installation of a computer program 350 to the computing device 120. Examples of ways of monitoring for installation events include, but are not limited to, detecting execution or use of software installation packages (e.g., Windows Intaller), processes, files, or settings, detecting first-time execution of computer programs 350, and creating, modifying, or deleting certain types of files such as Microsoft Windows® ".msi" files. Monitoring functions may be performed periodically (e.g., once every few seconds) or in response to the occurrence of predetermined events.

Agent 360 may be configured to provide notification of the detection of a trigger event. For example, agent 360 may initiate the sending of a notification message from computing device 120 to patch management subsystem 110, the notification message including data associated with the detection of the trigger event.

In certain embodiments, agent 360 may be configured to perform patching operations to apply patches to one or more of the computer programs 350. Agent 360 may employ any technologies suitable for applying patches to the computer programs 350, including well known patching technologies. In certain embodiments, agent 360 may be configured to perform patching operations disclosed in the aforementioned and incorporated co-pending U.S. patent application Ser. No. 11/901,327, entitled "Systems and Methods for Patching Computer Programs," by Mark Greenwood et al., filed on the same day as the present application.

Agent 360 may be configured to prevent (i.e., block) or permit (i.e., unblock) the execution of computer programs 350 on computing device 120. Execution of a computer program 350 may be prevented or permitted in any suitable manner. As part of preventing or permitting execution of a computer program, agent 360 may be configured to discover whether the computer program 350 has been determined to be vulnerable. One example of this includes but is in no way limited to running a check process upon initiation of a computer program 350. The check process may be hooked into an initiation process such as by hooking a predefined vulnerability checking DLL into a DLL load process. The check process may be configured to determine whether the computer program 350 is vulnerable as defined above, or whether a vulnerability indicator has been set for the computer program 350. For example, a computer program 350 that has been determined to be vulnerable may be added to a "blacklist." When the computer program 350 is initiated or otherwise run, agent 360 may check the blacklist to determine whether the computer program 350 has been labeled as being vulnerable. On the other hand, the check process may be configured to determined whether the computer program 350 has been added to a "whitelist," i.e., labeled as being approved for execution.

In certain embodiments, a vulnerability check process may be hooked into other processes as is done in Altiris® Application Metering Solution™ software provided by Altiris, Inc., a division of Symantec Corporation. Accordingly, the policies of this or similar software (e.g., virus checking software) may be modified to include checks for computer program vulnerability as defined herein. This may include modifying a whitelist or blacklist associated with policies of the software.

In other embodiments, agent 360 may be configured to monitor processes running on computing device 120. The monitoring may be performed periodically, e.g., once every few seconds. Any process identified as running on the computing device 120 may be checked against a "blacklist" to determine whether the process is vulnerable.

In yet other embodiments, when a file has been determined to be vulnerable (e.g., needing updating), a file or process (e.g., a system DLL) may be monitored and protected. For example, agent 360 may be configured to detect requests for the file or process to be loaded, identify the computer program 350 responsible for the requests, and prevent the computer program 350 from running.

When agent 360 discovers that a computer program 350 is vulnerable, agent 360 may prevent execution of the computer program 350. This may be done in any suitable manner, including terminating execution of one or more processes, removing or quarantining the computer program 350, stopping initiation of one or more processes (e.g., loading of certain files or configuration settings), placing increased security on the computer program 350 or the directory in which it is stored or otherwise associated.

Based on the above, agent 360 can prevent or permit execution of a computer program 350 on a computing device 120 based on a patch analysis and determination of vulnerability performed by patch management subsystem 110. In certain embodiments, agent 360 may prevent or permit execution of a computer program 350 in accordance with an instruction received from patch management subsystem 110. For example, patch management subsystem 110 may instruct agent 360 or other component of computing device 120 to blacklist vulnerable computer programs 350 or whitelist non-vulnerable computer programs 350, the lists being usable by agent 350 to discover whether processes, files, etc. are associated with a vulnerable computer program 350. Accordingly, patch management subsystem 110 can be used to selectively control which computer programs 350 will be allowed or denied execution on computing device 120. This provides capabilities to block execution of one or more computer programs 350 that are determined to be in a vulnerable state because they are missing certain patches, for example. Accordingly, vulnerabilities that would otherwise be introduced by execution of un-patched or otherwise out-of-date computer programs 350 can be eliminated in computing system 100.

In certain embodiments, agent 360 may be configured to block execution of a computer program 350 in response to a detection of an occurrence of a trigger event associated with the computer program 350. This allows execution of the computer program 350 to be blocked while patch analysis and vulnerability determination operations are being performed. In certain embodiments, execution of the computer program 350 may be blocked until the patch management subsystem 110 instructs agent 360 to unblock the execution of the computer program 350, such as when the computer program 360 is determined not to be vulnerable. On the other hand, if the computer program 350 is determined to be vulnerable, the patch management subsystem 110 may instruct agent 360 to maintain the block on the execution of the computer program 350.

In certain embodiments, agent 360 may be configured to determine whether a vulnerable computer program 350 can be updated using local resources before blocking execution of the computer program 350. For example, if a DLL file associated with execution of the computer program 350 has been blacklisted as being vulnerable, agent 360 may be configured to search for an updated DLL file that can be used to replace the vulnerable DLL file.

Agent 360 may be configured to provide notifications related to the above-described operations and/or conditions. For example, agent 360 may be configured to inform a user of computer device 120 that execution of a computer program is blocked, or that execution is denied pending updating of the computer program.

In certain embodiments, the blocking of execution of a computer program may be left to the discretion of a user, such as a user of the computing device 120 or an administrator of system 100. For example, when execution of a vulnerable computer program is initiated, agent 360 may be configured to generate and provide notice to the user. The notice may inform the user that the computer program has been found to be vulnerable (e.g., it is missing one or more patches) and ask the user whether to continue or cancel the execution of the computer program, and/or whether execution of the computer program should be automatically blocked going forward until the computer program is updated.

As an example of computer program update protection in system 100, a user of a computing device 120 may install a particular computer program 350 referred to as an application. Where installation of the application is a predetermined trigger event, agent 360 can detect and report the installation of the application to the patch management subsystem 110. In response to the detected installation of the application, the patch management module 240 of patch management subsystem 110 may perform a patch analysis for the application. As described above, the patch analysis can be used to identify any available patches that are applicable but have not yet been applied to the application.

The patch management module 240 may utilize the results of the patch analysis to determine whether the application is vulnerable. This determination may be made in any of the ways described above. If the application is deemed not to be in a vulnerable state, patch management subsystem 110 may provide notice to the computing device 120. Based on the notice, agent 360 may permit execution of the application on computing device 120. Permitting execution of the application may include passive and/or active operations.

On the other hand, if the application is deemed to be in a vulnerable state, patch management subsystem 110 may provide notice to the computing device 120. Based on the notice, agent 360 may prevent the application from being executed on computing device 120. Accordingly, if the user attempts to launch the application, agent 360 will block execution, thereby protecting system 100 from attacks, bugs, or other problems to which the system 100 may be exposed if the vulnerable (e.g., un-patched) application were executed.

While blocked from execution, the application may be patched with one or more patches as described above. Patch analysis and determination of vulnerability may be repeated for the patched application. Once the patched application is determined not be in a vulnerable state, patch management subsystem 110 may provide notice to the computing device 120, and agent 360 may permit execution of the application.

Exemplary Methods

Figure 4:
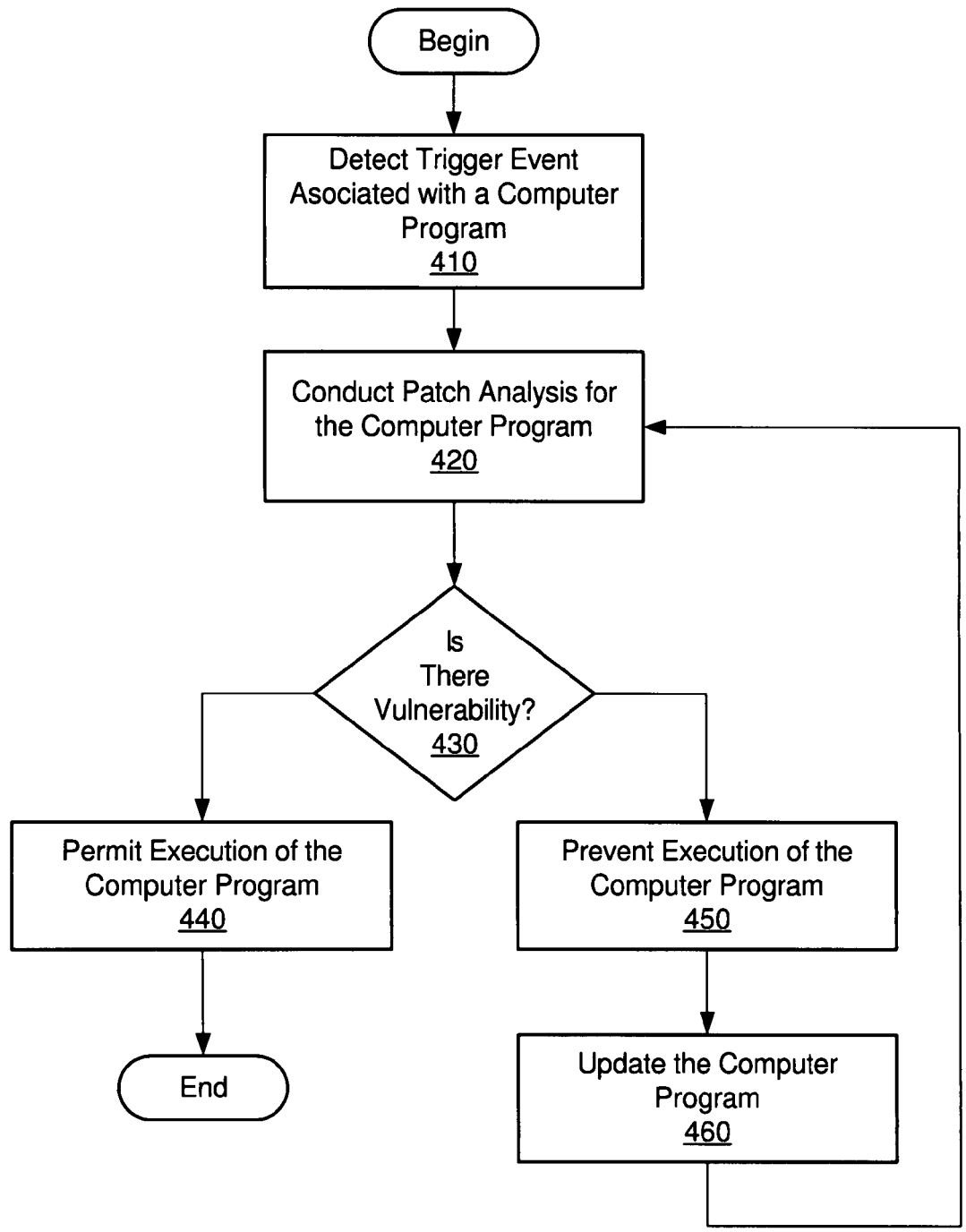
FIG. 4 illustrates an exemplary computer program update protection method.

FIG. 4 illustrates an exemplary computer program update protection method. While FIG. 4 illustrates exemplary acts according to one embodiment, other embodiments may omit, add to, reorder, and/or modify any of the acts shown in FIG. 4.

In step 410, a trigger event associated with a computer program 350 is detected. Step 410 may be performed in any of the ways described above, including agent 360 detecting a trigger event such as an installation of the computer program 350 on a computing device 120.

In step 420, a patch analysis is conducted for the computer program 350. Step 420 may be performed in any of the ways described above, including agent 360 notifying the patch management subsystem 110 of the detected trigger event and providing data related to the computed program 350, and the patch management subsystem 110 identifying any applicable patches that have not yet been applied to the computer program 350.

In step 430, it is determined whether the computer program 350 is vulnerable. Step 430 may be performed in any of the ways described above, including the patch management subsystem 110 determining whether a vulnerability threshold is satisfied. In certain examples, this may include determining whether any of applicable patches not yet applied to the computer program 350 have a predetermined classification such as "critical" or "mandatory" patches.

In there is no detected vulnerability, processing moves to step 440. In step 440, execution of the computer program 350 is permitted. Step 440 may be performed in any of the ways described above, including the patch management subsystem 110 notifying agent 360 to permit execution of the application. Step 440 may be an active or passive step.

If vulnerability is detected in step 430, processing moves from step 430 to step 450. In step 450, execution of the computer program 350 is prevented. Step 450 may be performed in any of the ways described above, including the patch management subsystem 110 notifying agent 360 to block the execution of the computer program 450 and the agent 360 acting accordingly.

In step 460, the computer program 350 is updated. Step 460 may be performed in any of the ways described above, including the patch management subsystem 110 deploying one or more of the applicable patches identified in step 420 to the computing device 120, and agent 360 applying the patches to the computer program 350.

In certain embodiments, processing may return from step 460 to step 420 for analysis of the patched computer program 350. Any of steps 420-460 may be repeated until the computer program 350 is finally determined to be free of vulnerabilities and permitted to be executed. Once execution of the computer program 350 is permitted in step 440, the process ends. In other embodiments, the additional analysis may be foregone and the computer program 350 may be allowed to execute after it is updated in step 460.

Figure 5:
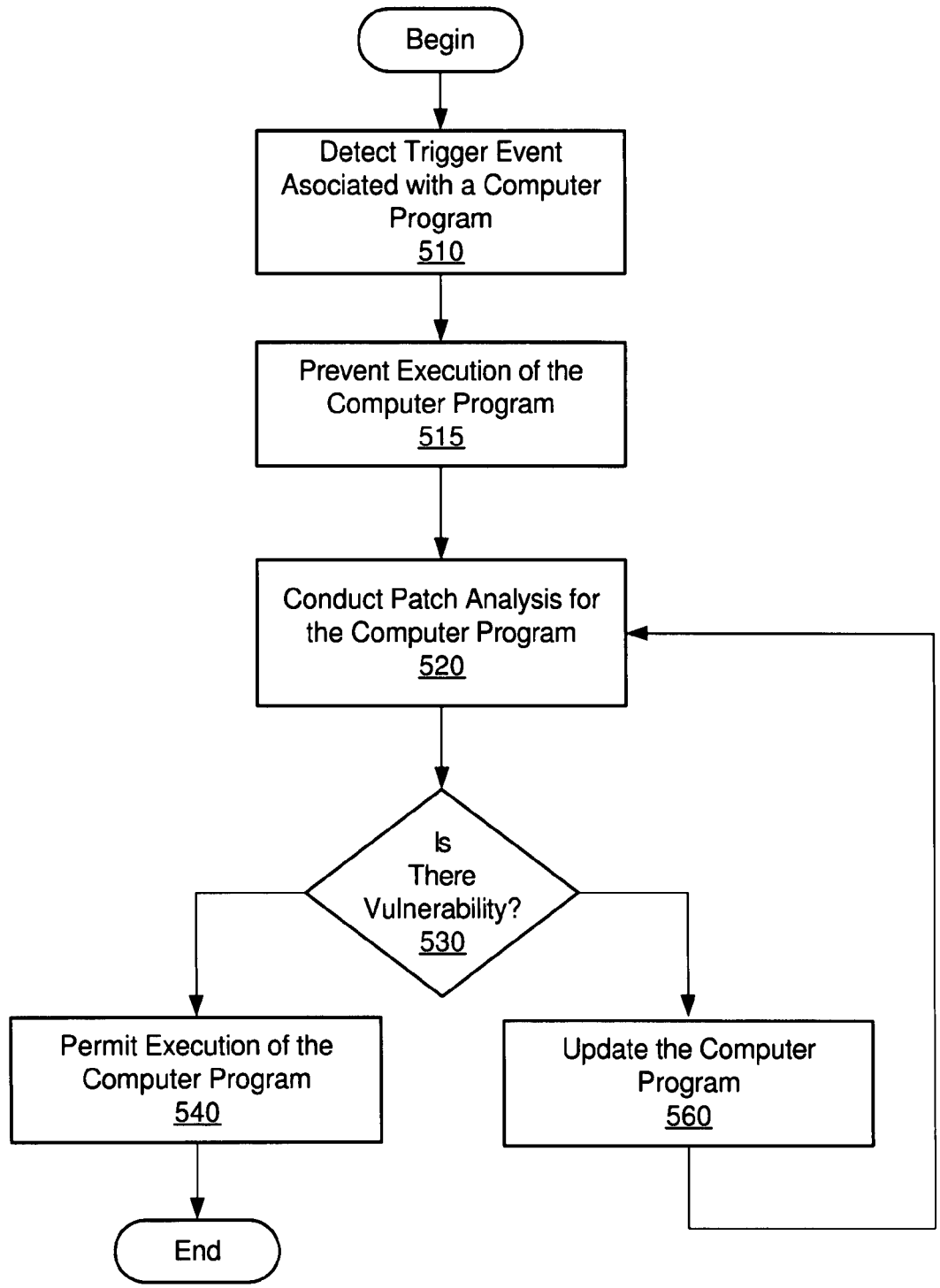
FIG. 5 illustrates another exemplary computer program update protection method.

FIG. 5 illustrates another exemplary computer program update protection method. While FIG. 5 illustrates exemplary acts according to one embodiment, other embodiments may omit, add to, reorder, and/or modify any of the acts shown in FIG. 5.

In step 510, a trigger event associated with a computer program 350 is detected. Step 510 may be performed in the same or similar ways as step 410 described above.

In step 515, execution of the computer program 350 is prevented. Step 515 may be performed in the same or similar ways as step 460 described above, except that in step 515, the execution of the computer program 350 is prevented in response to the detection of the trigger event. This operation may be performed based on a default action setting having been configured to prevent execution of computer programs 350 when a predetermined trigger event is detected.

In step 520, a patch analysis is conducted for the computer program 350. Step 520 may be performed in the same or similar ways as step 420 described above.

In step 530, it is determined whether the computer program 350 is vulnerable. Step 530 may be performed in the same or similar ways as step 430 described above.

In there is no vulnerability in step 530, processing moves to step 540. In step 540, execution of the computer program 350 is permitted. Step 540 may effectually reverse step 515. Step 540 may be performed in the same or similar ways as step 440 described above.

If vulnerability is detected in step 530, the prevention of execution of the computer program 350 is maintained and processing moves from step 530 to step 560. In step 560, the computer program 350 is updated. Step 560 may be performed in the same or similar ways as step 460 described above.

In certain embodiments, processing may return from step 560 to step 520 for analysis of the patched computer program 350. Any of steps 420-460 may be repeated until the computer program 350 is finally determined to be free of vulnerabilities and permitted to be executed. Once execution of the computer program 350 is permitted in step 540, the process ends. In other embodiments, the analysis of the patched computer program 350 may be foregone and the computer program 350 allowed to execute after it is updated in step 560.

The preceding description has been presented only to illustrate and describe exemplary embodiments and implementations with reference to the accompanying drawings. It will, however, be evident that various modifications and changes may be made thereto, and additional implementations may be implemented, without departing from the scope of the invention as set forth in the claims that follow. The above description and accompanying drawings are accordingly to be regarded in an illustrative rather than a restrictive sense.

What is claimed is:

1. A computer-implemented method comprising:
    detecting, at a computing device that comprises at least one processor, an installation of a computer program onto the computing device;
    in response to detecting the installation of the computer program, determining, by causing the computing device to automatically conduct a patch analysis for the computer program, that the computer program is missing at least one applicable patch;
    determining, based on the results of the patch analysis, that the computer program is vulnerable, wherein:
    the computer program is determined to be vulnerable based on the at least one applicable patch being associated with a predetermined classification that indicates that the applicable patch is at least one of critical, mandatory, and recommended;
    an administrator causes the predetermined classification to signify vulnerability;
    in response to the determination that the computer program is vulnerable, blocking the computer program from executing on the computing device;
    while the computer program is blocked from executing on the computing device, iteratively identifying and applying at least one applicable patch to the computer program until the computer program is no longer vulnerable;
    upon determining that the computer program is no longer vulnerable, allowing the computer program to execute on the computing device.

2. The method of claim 1, further comprising determining that the computer program was installed subsequent to a prior patch deployment.

3. The method of claim 1, wherein applying the at least one applicable patch to the computer program comprises at least one of:
    receiving the at least one applicable patch from a remote patch management subsystem;
    applying the at least one applicable patch to the computer program using local resources.

4. The method of claim 1, further comprising determining, prior to blocking the computer program from executing on the computing device, that the computer program cannot be updated using local resources.

5. The method of claim 1, wherein detecting the installation of the computer program comprises detecting at least one of:
    execution of a software installation package;
    creation or modification of a specific file type.

6. The method of claim 1, wherein blocking the computer program from executing on the computing device comprises:
    notifying a user that the computer program is vulnerable;
    receiving an instruction from the user to block the computer program.

7. The method of claim 1, wherein determining that the computer program is vulnerable comprises determining that the computer program satisfies a predetermined vulnerability threshold.

8. A system comprising at least one processor configured to execute at least one module that is programmed to:
    detect, at a computing device, an installation of a computer program onto the computing device;
    in response to detecting the installation of the computer program, determining, by causing the computing device to automatically conduct a patch analysis for the computer program, that the computer program is missing at least one applicable patch;
    determine, based on the results of the patch analysis, that the computer program is vulnerable, wherein:
    the computer program is determined to be vulnerable based on the at least one applicable patch being associated with a predetermined classification that indicates that the applicable patch is at least one of critical, mandatory, and recommended;
    an administrator causes the predetermined classification to signify vulnerability;
    in response to the determination that the computer program is vulnerable, block the computer program from executing on the computing device;
    while the computer program is blocked from executing on the computing device, iteratively identify and apply at least one applicable patch to the computer program until the computer program is no longer vulnerable;
    upon determining that the computer program is no longer vulnerable, allow the computer program to execute on the computing device.

9. The system of claim 8, wherein the at least one module is further programmed to determine that the computer program was installed subsequent to a prior patch deployment.

10. The system of claim 8, wherein the at least one module is programmed to apply the at least one applicable patch to the computer program by at least one of:
    receiving the at least one applicable patch from a remote patch management subsystem;
    applying the at least one applicable patch to the computer program using local resources.

11. The system of claim 8, wherein the at least one module is further programmed to determine, prior to blocking the computer program from executing on the computing device, that the computer program cannot be updated using local resources.

12. The system of claim 8, wherein detecting the installation of the computer program comprises detecting at least one of:
    execution of a software installation package;
    creation or modification of a specific file type.

13. The system of claim 8, wherein blocking the computer program from executing on the computing device comprises:
    notifying a user that the computer program is vulnerable;
    receiving an instruction from the user to block the computer program.

14. The system of claim 8, wherein determining that the computer program is vulnerable comprises determining that the computer program satisfies a predetermined vulnerability threshold.

15. A computer program product embodied in at least one non-transitory computer readable medium and comprising computer instructions executable by at least one processor of at least one computing device to perform the functions of:
    detecting, at the computing device, an installation of a computer program onto the computing device;
    in response to detecting the installation of the computer program, determining, by causing the computing device to automatically conduct a patch analysis for the computer program, that the computer program is missing at least one applicable patch;

determining, based on the results of the patch analysis, that the computer program is vulnerable, wherein:

the computer program is determined to be vulnerable based on the at least one applicable patch being associated with a predetermined classification that indicates that the applicable patch is at least one of critical, mandatory, and recommended;

an administrator causes the predetermined classification to signify vulnerability;

in response to the determination that the computer program is vulnerable, blocking the computer program from executing on the computing device;

while the computer program is blocked from executing on the computing device, iteratively identifying and applying at least one applicable patch to the computer program until the computer program is no longer vulnerable;

upon determining that the computer program is no longer vulnerable, allowing the computer program to execute on the computing device.

16. The computer program product of claim 15, further comprising computer instructions executable by the at least one processor of the at least one computing device to perform the function of determining that the computer program was installed subsequent to a prior patch deployment.

17. The computer program product of claim 15, wherein applying the at least one applicable patch to the computer program comprises at least one of:

receiving the at least one applicable patch from a remote patch management subsystem;

applying the at least one applicable patch to the computer program using local resources.

18. The computer program product of claim 15, further comprising computer instructions executable by the at least one processor of the at least one computing device to perform the function of determining, prior to blocking the computer program from executing on the computing device, that the computer program cannot be updated using local resources.

19. The computer program product of claim 15, wherein determining that the computer program is vulnerable comprises determining that the computer program satisfies a predetermined vulnerability threshold.

* * * * *